US008824557B2

(12) United States Patent
Srinivasan

(10) Patent No.: US 8,824,557 B2
(45) Date of Patent: Sep. 2, 2014

(54) ADAPTIVE COEFFICIENT SCAN ORDER

(71) Applicant: Microsoft Corporation, Redmond, WA (US)

(72) Inventor: Sridhar Srinivasan, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/674,748

(22) Filed: Nov. 12, 2012

(65) Prior Publication Data

US 2013/0070843 A1    Mar. 21, 2013

Related U.S. Application Data

(63) Continuation of application No. 11/026,650, filed on Dec. 31, 2004, now Pat. No. 8,311,119.

(51) Int. Cl.
*H04N 7/18* (2006.01)
*H04N 11/02* (2006.01)
*H04N 11/04* (2006.01)

(52) U.S. Cl.
USPC ............. 375/240.18; 375/240.23; 375/240.24

(58) Field of Classification Search
USPC ........................... 375/240.18, 240.23, 240.24
See application file for complete search history.

(56) References Cited

U.S. PATENT DOCUMENTS

| 5,481,553 | A | 1/1996 | Suzuki et al. |
| 5,714,950 | A | 2/1998 | Jeong et al. |
| 5,729,484 | A | 3/1998 | Mack et al. |
| 5,767,909 | A | 6/1998 | Jung |
| 6,408,025 | B1 | 6/2002 | Kaup |
| 7,215,707 | B2 | 5/2007 | Lee et al. |
| 7,688,894 | B2 | 3/2010 | Lin et al. |
| 7,782,954 | B2 | 8/2010 | Liang et al. |
| 2002/0107669 | A1 | 8/2002 | Chen |
| 2003/0128753 | A1* | 7/2003 | Lee et al. .................. 375/240.2 |
| 2003/0138150 | A1 | 7/2003 | Srinivasan |
| 2003/0156648 | A1 | 8/2003 | Holcomb et al. |

(Continued)

FOREIGN PATENT DOCUMENTS

| CN | 1431828 | 7/2003 |
| EP | 0836328 | 4/1998 |

(Continued)

OTHER PUBLICATIONS

Final Notice of Preliminary Rejection dated Nov. 15, 2012, Korean Patent Application No. 10-2005-0115372 (with English translation), 5 pp.

(Continued)

*Primary Examiner* — Chikaodili E Anyikire
(74) *Attorney, Agent, or Firm* — Micah Goldsmith; Glen Johnson; Micky Minhas

(57) ABSTRACT

A digital media codec adaptively re-arranges a coefficient scan order of transform coefficients in accordance with the local statistics of the digital media, so that the coefficients can be encoded more efficiently using entropy encoding. The adaptive scan ordering is applied causally at encoding and decoding to avoid explicitly signaling the scan order to the decoder in the compressed digital media stream. For computational efficiency, the adaptive scan order re-arranges the scan order by applying a conditional exchange operation on adjacently ordered coefficient locations via a single traversal of the scan order per update of the statistical analysis.

18 Claims, 9 Drawing Sheets

(56) References Cited

U.S. PATENT DOCUMENTS

| | | |
|---|---|---|
| 2004/0120590 A1 | 6/2004 | Fuchs et al. |
| 2005/0068208 A1 | 3/2005 | Liang et al. |
| 2005/0078754 A1 | 4/2005 | Lin et al. |

FOREIGN PATENT DOCUMENTS

| | | |
|---|---|---|
| JP | 6-177774 | 6/1994 |
| JP | 7-050836 | 2/1995 |
| JP | 7-087331 | 3/1995 |
| JP | 8-280021 | 10/1996 |
| JP | 9-074562 | 3/1997 |
| JP | 11-275582 | 10/1999 |
| JP | 2003-250157 | 9/2003 |
| JP | 2003-333339 | 11/2003 |
| KR | 2000-0073634 | 12/2000 |
| RU | 2119727 | 9/1998 |
| RU | 2202826 | 4/2003 |

OTHER PUBLICATIONS

Communication pursuant to Article 94(3) EPC dated Oct. 1, 2010, from European Patent Application No. 05026123.9, 4 pp.
Decision to Grant dated May 13, 2010, from Russian Patent Application No. 2005137246 (with English translation), 17 pp.
European Search Report dated Jun. 22, 2006, from European Patent Application No. 05026123.9, 7 pp.
Examiner's First Report dated Oct. 13, 2009, from Australian Patent Application No. 2005234613, 5 pp.
Examiner's Report dated Jul. 30, 2012, from Canadian Patent Application No. 2527654, 3 pp.
Fan et al., "A Novel Coefficient Scanning Scheme for Directional Spatial Prediction-Based Image Compression," *Multimedia and Expo Proceedings*, pp. 557-560 (Jul. 2003).
ISO/IEC, "ISO/IEC 11172-2, Information technology—Coding of moving pictures and associated audio for digital storage media at up to about 1,5 Mbit/s—Part 2: Video," 112 pp. (1993).
ISO/IEC, "JTC1/SC29/WG11 N2202, Information Technology—Coding of Audio-Visual Objects: Visual, ISO/IEC 14496-2," 329 pp. (1998).
ITU-T, "ITU-T Recommendation H.261, Video Codec for Audiovisual Services at p × 64 kbits," 25 pp. (1993).
ITU-T, "ITU-T Recommendation H.262, Information Technology—Generic Coding of Moving Pictures and Associated Audio Information: Video," 205 pp. (1995).
ITU-T, "ITU-T Recommendation H.263, Video coding for low bit rate communication," 162 pp. (1998).
Joint Video Team (JVT) of ISO/IEC MPEG & ITU-T VCEG, "Joint Final Committee Draft (JFCD) of Joint Video Specification," JVT-D157, 207 pp. (Aug. 2002).
Martin, "Sorting," *Computer Surveys*, vol. 3, No. 4, pp. 147-174 (Dec. 1971).
Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].
Mook, "Next-Gen Windows Media Player Leaks to the Web," BetaNews, 18 pp. (Jul. 2002) [Downloaded from the World Wide Web on Mar. 16, 2004].
Notice of Acceptance dated Feb. 16, 2010, from Australian Patent Application No. 2005234613, 3 pp.
Notice of Preliminary Rejection dated Jun. 13, 2012, from Korean Patent Application No. 10-2005-0115372, 4 pp.
Notice of Reason for Rejection dated May 20, 2010, from Japanese Patent Application No. 2005-379861 (with English translation), 8 pp.
Notice of Final Rejection dated Sep. 10, 2010, from Japanese Patent Application No. 2005-379861 (with partial English translation), 5 pp.
Notice of Allowance dated Feb. 4, 2011, from Japanese Patent Application No. 2005-379861 (with English translation), 4 pp.
Notice of Allowance dated Feb. 18, 2010, from Mexican Patent Application No. PA/a/2005/012973, 2 pp.
Notice on First Office Action dated Sep. 11, 2009, from Chinese Patent Application No. 200510128737.2 (with English translation), 11 pp.
Notice on Grant of patent Right for Invention dated Mar. 20, 2012, from Chinese Patent Application No. 200510128737.2, 4 pp.
Notice on the Second Office Action dated Jun. 29, 2011, from Chinese Patent Application No. 200510128737.2 (with English translation), 11 pp.
Notice on the Third Office Action dated Nov. 30, 2011, from Chinese Patent Application No. 200510128737.2 (with English translation), 7 pp.
Official Action dated Sep. 22, 2009, from Russian Patent Application No. 2005137246, 3 pp.
Zeng et al., "Directional Discrete Cosine Transform for Image Coding," *IEEE Int'l Conf. on Multimedia and Expo*, pp. 721-724 (Jul. 2006).
Examiner's Report dated Jul. 24, 2013, from Canadian Patent Application No. 2527654, 2 pp.

\* cited by examiner

| Order | 4 | 8 | 5 | 1 | 12 | 9 | 6 | 2 | 13 | 3 | 15 | 7 | 10 | 14 | 11 |
|---|---|---|---|---|---|---|---|---|---|---|---|---|---|---|---|
| Totals | 56 | 52 | 48 | 44 | 40 | 36 | 32 | 28 | 24 | 20 | 16 | 12 | 8 | 4 | 0 |

910 → Order
920 → Totals

| Order | 4 | 8 | 5 | 1 | 12 | 9 | 6 | 2 | 13 | 3 | 15 | 7 | 10 | 14 | 11 |
|---|---|---|---|---|---|---|---|---|---|---|---|---|---|---|---|
| Totals | 60 | 54 | 55 | 48 | 40 | 40 | 36 | 33 | 26 | 24 | 17 | 16 | 12 | 5 | 3 |

910 → Order
920 → Totals

| Order | 4 | 5 | 8 | 1 | 12 | 9 | 6 | 2 | 13 | 3 | 15 | 7 | 10 | 14 | 11 |
|---|---|---|---|---|---|---|---|---|---|---|---|---|---|---|---|
| Totals | 60 | 55 | 54 | 48 | 40 | 40 | 36 | 33 | 26 | 24 | 17 | 16 | 12 | 5 | 3 |

910 → Order
920 → Totals

Software 1380 Implementing Adaptive
Coefficient Scan Ordering

US 8,824,557 B2

ADAPTIVE COEFFICIENT SCAN ORDER

CROSS REFERENCE TO RELATED APPLICATIONS

This application is a continuation of U.S. patent application Ser. No. 11/026,650, filed Dec. 31, 2004, which is hereby incorporated by reference.

TECHNICAL FIELD

The invention relates generally to block transform-based digital media (e.g., video and image) compression.

BACKGROUND

Overview of Block Transform-Based Coding

Transform coding is a compression technique used in many audio, image and video compression systems. Uncompressed digital image and video is typically represented or captured as samples of picture elements or colors at locations in an image or video frame arranged in a two-dimensional (2D) grid. This is referred to as a spatial-domain representation of the image or video. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling. Similarly, digital audio is typically represented as time-sampled audio signal stream. For example, a typical audio format consists of a stream of 16-bit amplitude samples of an audio signal taken at regular time intervals.

Uncompressed digital audio, image and video signals can consume considerable storage and transmission capacity. Transform coding reduces the size of digital audio, images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain, or of audio in the time domain.

More specifically, a typical block transform-based codec 100 shown in FIG. 1 divides the uncompressed digital image's pixels into fixed-size two dimensional blocks ($X_1, \ldots X_n$), each block possibly overlapping with other blocks. A linear transform 120-121 that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized 130 (i.e., reduced in resolution, such as by dropping least significant bits of the coefficient values or otherwise mapping values in a higher resolution number set to a lower resolution), and also entropy or variable-length coded 130 into a compressed data stream. At decoding, the transform coefficients will inversely transform 170-171 to nearly reconstruct the original color/spatial sampled image/video signal (reconstructed blocks $\hat{X}_1, \ldots \hat{X}_n$).

The block transform 120-121 can be defined as a mathematical operation on a vector x of size N. Most often, the operation is a linear multiplication, producing the transform domain output y=Mx, M being the transform matrix. When the input data is arbitrarily long, it is segmented into N sized vectors and a block transform is applied to each segment. For the purpose of data compression, reversible block transforms are chosen. In other words, the matrix M is invertible. In multiple dimensions (e.g., for image and video), block transforms are typically implemented as separable operations.

The matrix multiplication is applied separably along each dimension of the data (i.e., both rows and columns).

For compression, the transform coefficients (components of vector y) may be selectively quantized (i.e., reduced in resolution, such as by dropping least significant bits of the coefficient values or otherwise mapping values in a higher resolution number set to a lower resolution), and also entropy or variable-length coded into a compressed data stream.

At decoding in the decoder 150, the inverse of these operations (dequantization/entropy decoding 160 and inverse block transform 170-171) are applied on the decoder 150 side, as show in FIG. 1. While reconstructing the data, the inverse matrix $M^{-1}$ (inverse transform 170-171) is applied as a multiplier to the transform domain data. When applied to the transform domain data, the inverse transform nearly reconstructs the original time-domain or spatial-domain digital media.

The transform used may be simple DPCM type predictor/correctors, or they may be more complicated structures such as wavelets or DCTs (Discrete Cosine Transforms). The commonly used standards JPEG/MPEG2/MPEG4, JPEG2000, and Windows Media Video (WMV) use the DCT, wavelet, and integerized-DCT respectively. In addition, WMV uses a lapped smoothing operator that provides visual and rate-distortion benefit for intra blocks and intra frames. The lapped smoothing operator, in conjunction with the block transform, tries to mimic a lapped transform of the type described in H. S. Malvar, *Signal Processing with Lapped Transforms*, Artech House, Boston, Mass., 1992.

Coefficient Scan Patterns

Many block transform-based codecs including JPEG, MPEG2, MPEG4 and WMV use a run length coding technique to encode the quantized coefficients corresponding to a particular block. (See, e.g., W. B. Pennebaker and J. L. Mitchell, *JPEG: Still Image Compression Standard*, Van Nostrand Reinhold, New York, 1993.) Run length coding proceeds by scanning a block of quantized transform coefficients according to a pre-determined pattern. One such example is the continuous "zigzag" scan pattern shown in FIG. 3. There is no inherent requirement for a scan pattern to be continuous, although a similar continuous zigzag scan pattern is used widely in JPEG and MPEG2/4.

The run length coding technique exploits the statistics of the underlying transform. Typically, larger coefficients occur towards the "DC" value (which is conventionally represented at the top left corner), and the more infrequent and smaller coefficients happen at larger distances from DC. For example, it is common for most of the transform coefficients of a transform block to have a value of zero after quantization. Many scan patterns give higher priority to coefficients that are more likely to have non-zero values. In other words, such coefficients are scanned earlier in the scan pattern. In this way, the non-zero coefficients are more likely to be bunched together, followed by one or more long groups of zero value coefficients. In particular, this leads to more efficient run/level/last coding, but other forms of entropy coding also benefit from the reordering.

A video compression system that selects between a limited set of pre-determined or static scan patterns, such as depending upon the block dimensions and whether the image is in interlaced or progressive format, is described in Lin et al., "Scan Patterns For Interlaced Video Content," U.S. patent application Ser. No. 10/989,844, filed Nov. 15, 2004; and Liang et al., "Scan Patterns For Progressive Video Content," U.S. patent application Ser. No. 10/989,594, also filed Nov. 15, 2004.

SUMMARY

Challenge with Pre-Determined Coefficient Scan Patterns of Existing Codecs

We have observed that the pattern of likely coefficients in a transform block shows some kind of local data dependency. For instance in textured regions of an image, which may span several blocks in the horizontal and vertical dimensions, coefficients occur as expected. However, in regions of the image with strong vertical or horizontal features, the coefficients along the corresponding axis are more likely. Therefore, the scan pattern which is ideal (in the sense of reducing number of bits used) for textured regions is not always ideal for regions with linear features.

Moreover, the use of lapped transforms further affects the optimality of the scan pattern. When a lapped transform is implemented as a pre-filter followed by a block transform, discontinuities in the original image are enhanced by the pre-filter. The transform coefficients therefore show a higher variance, and moreover, the highest frequencies occur with greater strength. In fact, it is often observed that the highest 2D frequency (which is the transform coefficient that lies at the bottom right of the coefficient block of many transforms) is no longer the least probable.

There is a third reason for the lack of optimality of a given scan order for a range of image blocks. That is based on the varying efficiency of "DCAC prediction". DCAC prediction is an encoding tool that is used to minimize the occurrence and/or magnitude of "DCAC" coefficients, which are DC in either X or Y dimensions, and AC in the other. These are coefficients lying along the axes. For strongly linear regions, the DCAC coefficients can be predicted with a greater degree of confidence than for randomly textured regions. Therefore, not only is the best scan order dependent on the underlying data, it is also influenced by how well the underlying data can be predicted with its DCAC coefficients.

Adaptive Coefficient Scan Order

This challenge is addressed by an adaptive coefficient scan ordering technique described herein that efficiently matches the scan order of block coefficients with the local statistics of the image. Described implementations of this technique are computationally very efficient, and have minimum latency, which is significant benefit in image and video codecs were speed is critical. Moreover, the described adaptive coefficient scan order implementation "learns" the statistics from what is causally encountered by the encoder and decoder; therefore there is no additional signaling or bit usage in the compressed bit stream to send side information to the decoder.

Additional features and advantages of the invention will be made apparent from the following detailed description of embodiments that proceeds with reference to the accompanying drawings.

BRIEF DESCRIPTION OF THE DRAWINGS

FIG. 9 is a diagram illustrating an example of an initialized order and totals arrays used in the adaptive coefficient scan order procedure of FIG. 6 for tracking the incidence of non-zero values for the coefficients and corresponding scan order.

FIG. 10 is a diagram illustrating an example of a case in which elements of the arrays of FIG. 9 are swapped by the procedure of FIG. 6 to re-arrange the scan order of coefficients FIG. 11 is a diagram illustrating a resulting arrangement of elements of the arrays of FIG. 9 after the element swapping operation shown in FIG. 10.

DETAILED DESCRIPTION

The following description relates to a digital media compression system or codec, which utilizes an adaptive coefficient scan order technique. For purposes of illustration, an embodiment of a compression system incorporating the adaptive coefficient scan order technique is an image or video compression system. Alternatively, the reversible overlap operator also can be incorporated into compression systems or codecs for other digital media or 2D data. The adaptive coefficient scan order technique does not require that the digital media compression system encodes the compressed digital media data in a particular coding format.

1. Encoder/Decoder

Figure 1:
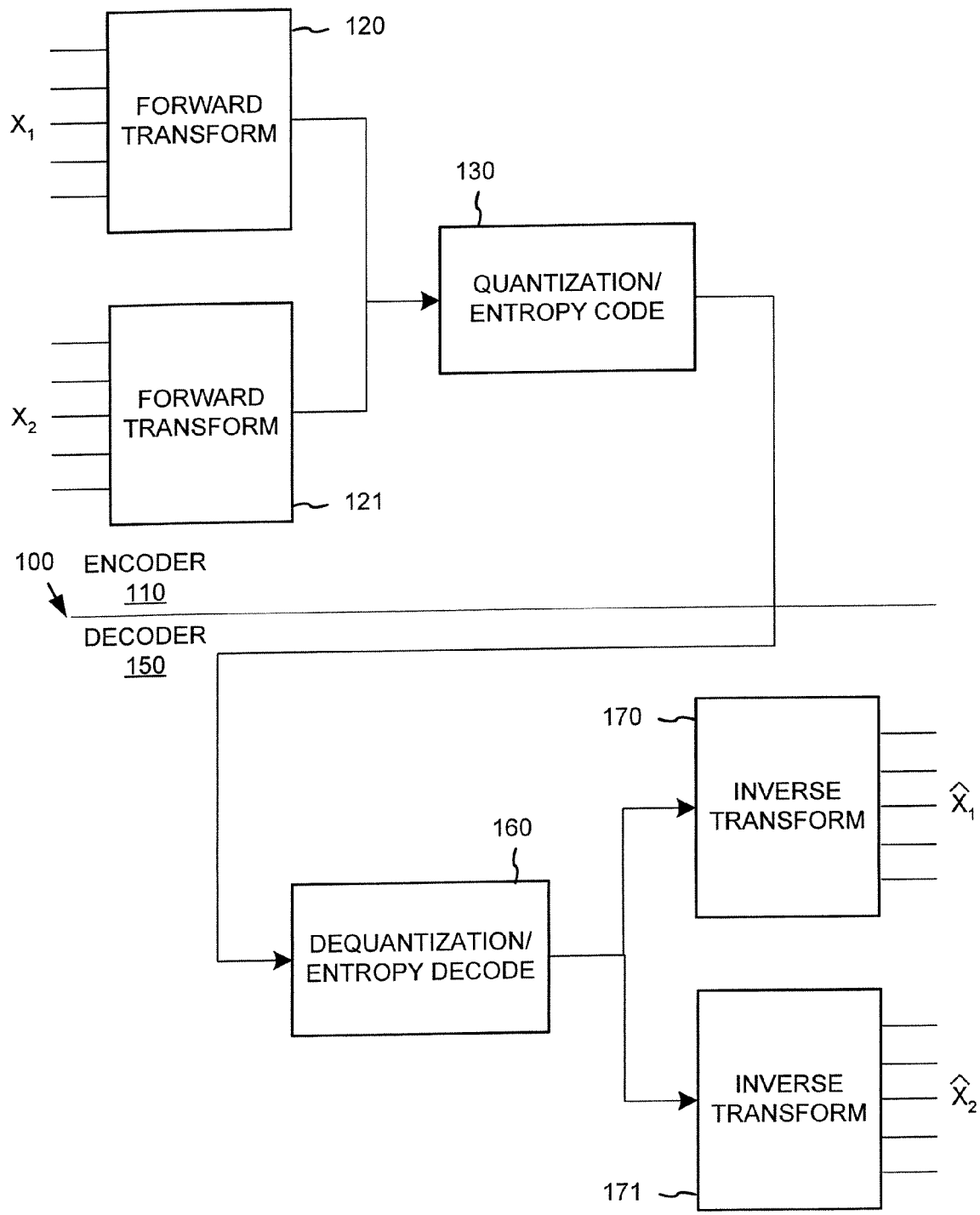
FIG. 1 is a block diagram of a conventional block transform-based codec in the prior art.
Figure 2:
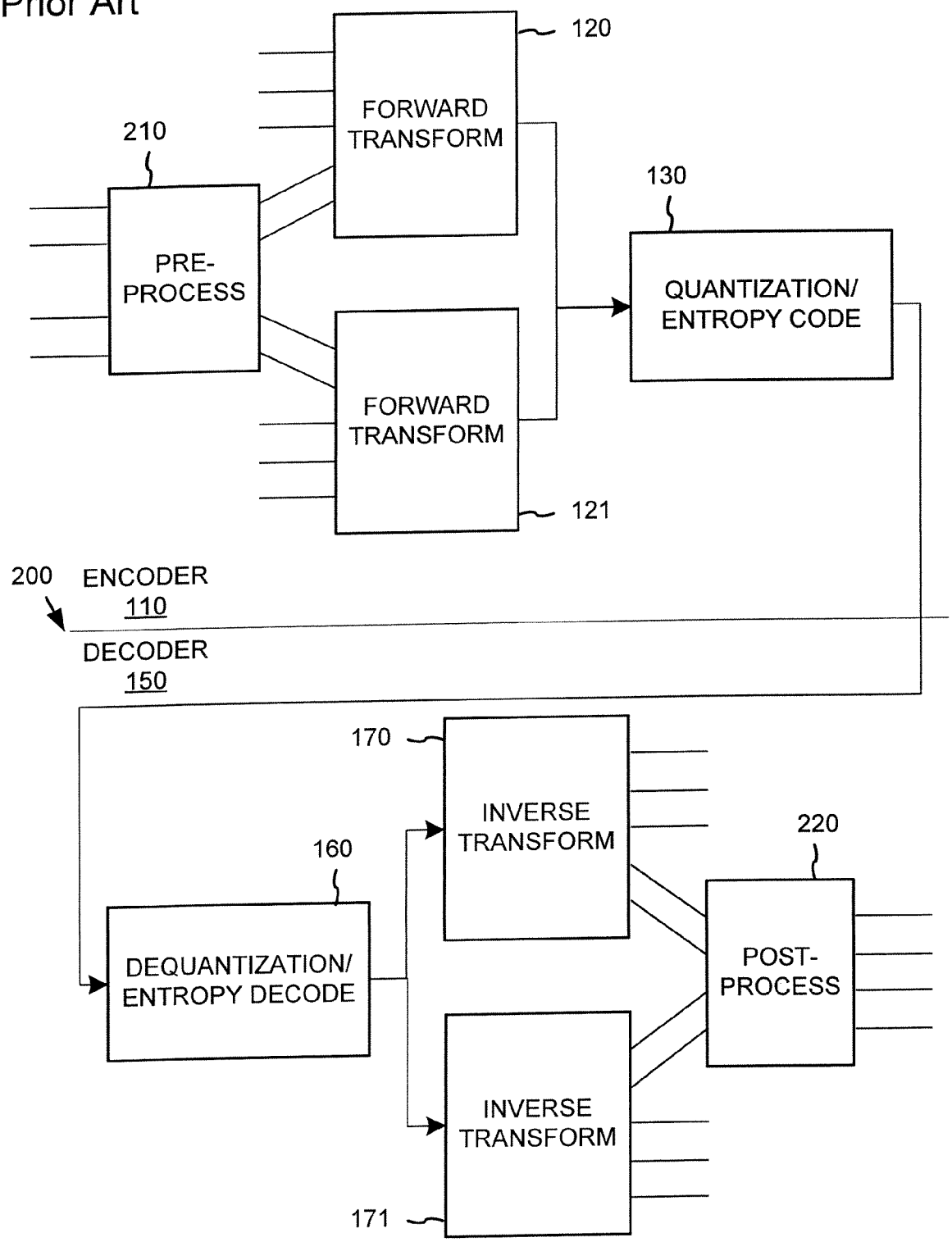
FIG. 2 is a block diagram of a spatial-domain lapped transform implemented as pre and post processing operations in combination with the block transform-based codec of FIG. 1, also in the prior art.
Figure 3:
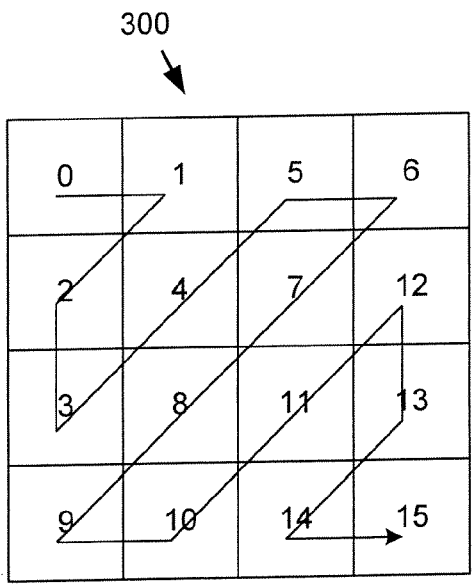
FIG. 3 is a diagram illustrating a coefficient scan order using a continuous zig-zag scan pattern in the prior art.
Figure 4:
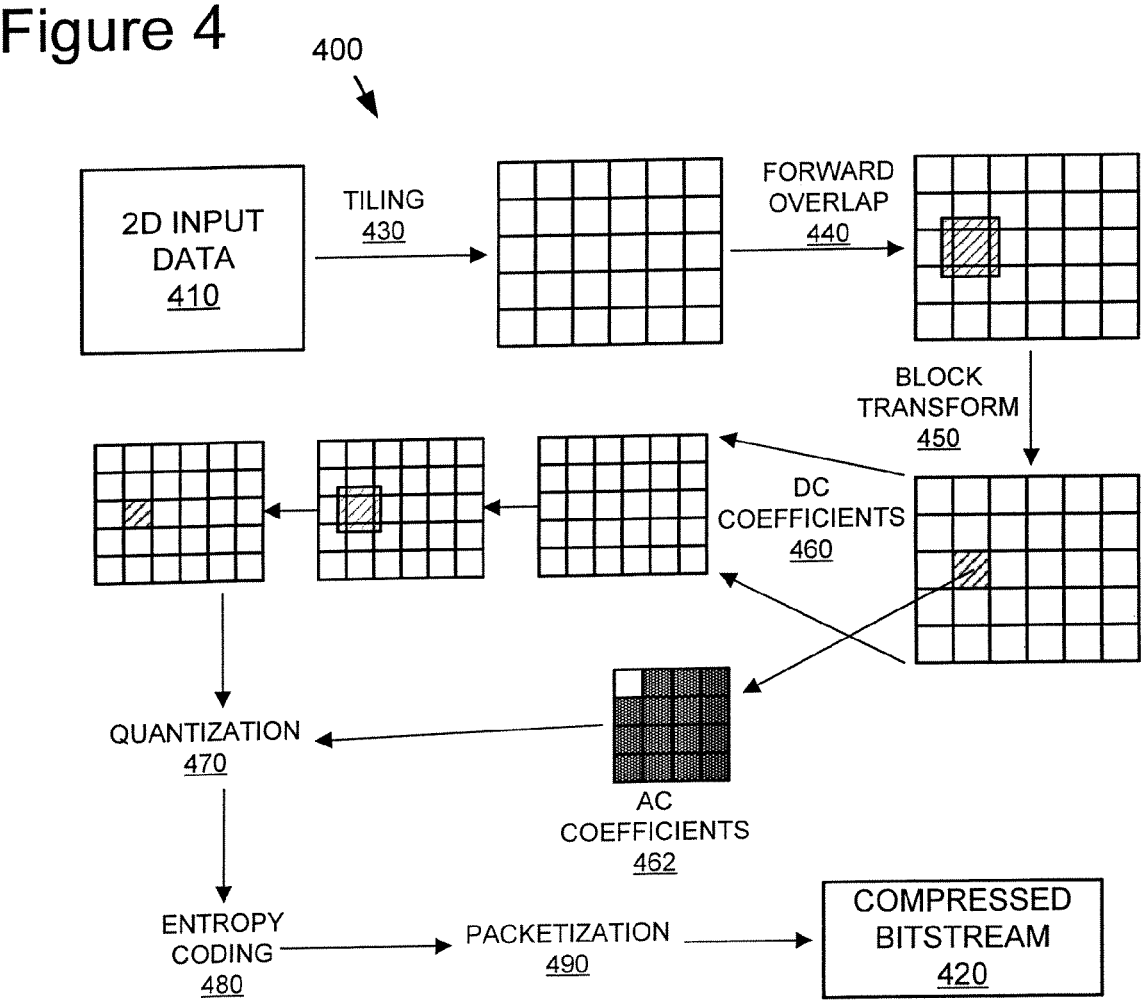
FIG. 4 is a flow diagram of an encoder based on a lapped transform utilizing a reversible overlap operator.
Figure 5:
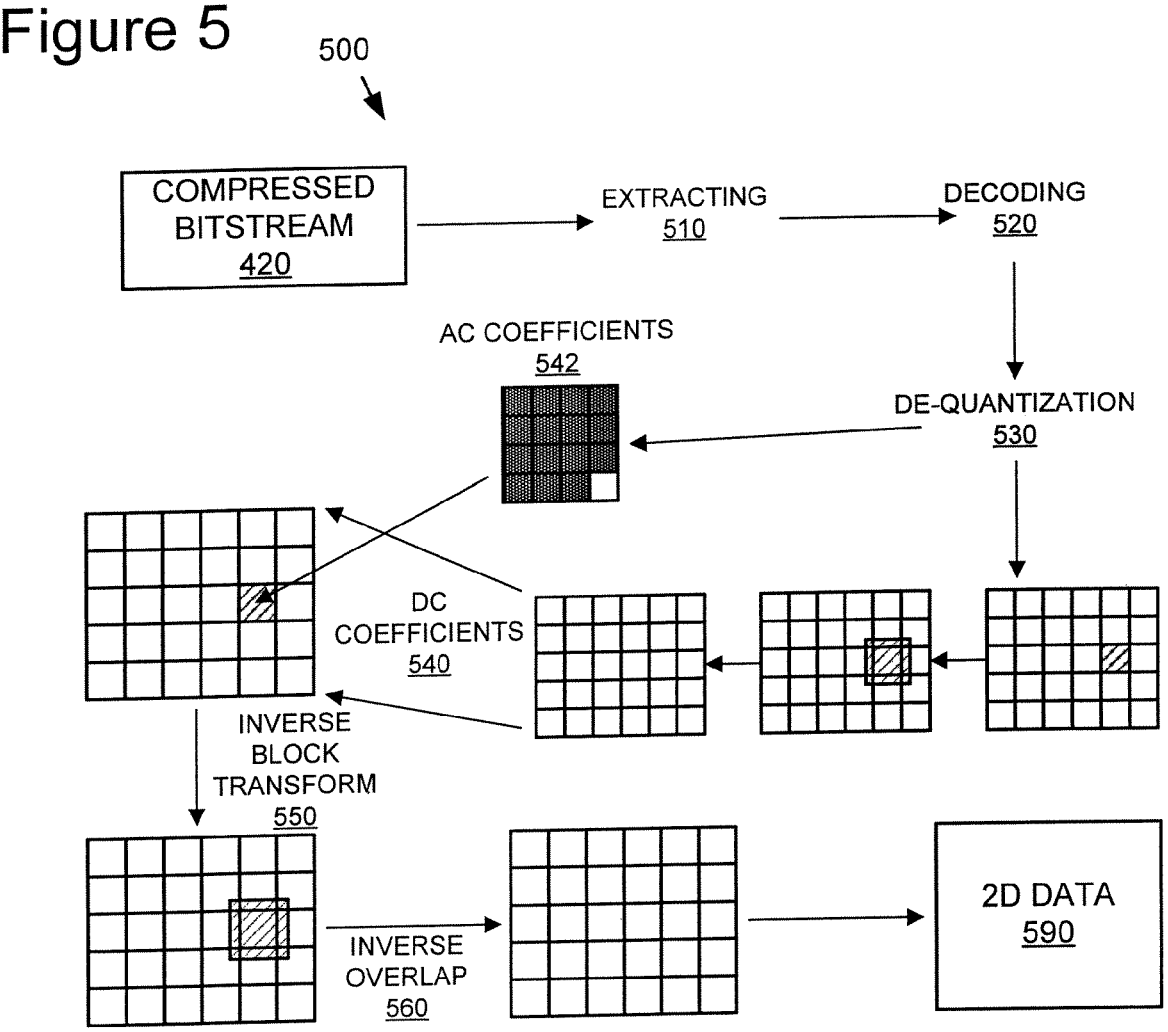
FIG. 5 is a flow diagram of an decoder based on the lapped transform.

FIGS. 4 and 5 are a generalized diagram of the processes employed in a representative 2-dimensional (2D) data encoder 400 and decoder 500 based on a lapped transform and using the adaptive coefficient scan order described more fully below. The diagrams present a generalized or simplified illustration of the use and application of this adaptive coefficient scan order technique in a compression system incorporating the 2D data encoder and decoder. In alternative encoders in which the adaptive coefficient scan order technique is incorporated, additional or fewer processes than those illustrated in this representative encoder and decoder can be used for the 2D data compression. For example, some encoders/decoders may also include color conversion, color formats, scalable coding, lossless coding, macroblock modes, etc. The compression system (encoder and decoder) can provide lossless and/or lossy compression of the 2D data, depending on the quantization which may be based on a quantization parameter varying from lossless to lossy.

The 2D data encoder 400 produces a compressed bitstream 420 that is a more compact representation (for typical input) of 2D data 410 presented as input to the encoder. For example, the 2D data input can be an image, a frame of a video sequence, or other data having two dimensions. The 2D data encoder tiles 430 the input data into macroblocks, which are 16×16 pixels in size in this representative encoder. The 2D data encoder further tiles each macroblock into 4×4 blocks 432. A "forward overlap" operator 440 is applied to each edge between blocks, after which each 4×4 block is transformed using a block transform 450. This block transform 450 can be the reversible, scale-free 2D transform described by Srinivasan, "Improved Reversible Transform For Lossy And Lossless 2-D Data Compression," U.S. Patent Application, filed Dec. 17, 2004, the disclosure of which is hereby incorporated by reference. The overlap operator can be the reversible overlap operator described by Tu et al., "Reversible Overlap Operator For Efficient Lossless Data Compression," U.S. Patent Application also filed Dec. 17, 2004, the disclosure of which is hereby incorporated by reference. Alternatively, the discrete cosine transform or other block transforms, lapped transforms and overlap operators can be used. Subsequent to the transform, the DC coefficient 460 of each 4×4 transform block is subject to a similar processing chain (tiling, forward overlap, followed by 4×4 block transform). The resulting DC transform coefficients and the AC transform coefficients are quantized 470, entropy coded 480 and packetized 490.

The decoder performs the reverse process. On the decoder side, the transform coefficient bits are extracted 510 from their respective packets, from which the coefficients are themselves decoded 520 and dequantized 530. The DC coefficients 540 are regenerated by applying an inverse transform, and the plane of DC coefficients is "inverse overlapped" using a suitable smoothing operator applied across the DC block edges. Subsequently, the entire data is regenerated by applying the 4×4 inverse transform 550 to the DC coefficients, and the AC coefficients 542 decoded from the bitstream. Finally, the block edges in the resulting image planes are inverse overlap filtered 560. This produces a reconstructed 2D data output.

2. Adaptive Coefficient Scan Order

The encoder 400 (FIG. 4) and decoder 500 (FIG. 5) of the illustrated digital media compression system utilize an adaptive coefficient scan order technique to further enhance the compression efficiency when entropy encoding the transform coefficients. This adaptive coefficient scan order efficiently adjusts the scan order of block coefficients in accordance with the local statistics of the digital media data, such that the coefficients can be encoded more efficiently by entropy encoding 480 (FIG. 4). The illustrated implementation of the adaptive coefficient scan order technique avoids added signaling or bit usage for sending side information to the decoder by using a same determinative process on both encoder and decoder side to learn the local statistics from what is causally encountered as the media data is processed by the encoder and decoder. Further, the illustrated implementation of the technique is computationally efficient, so as to impose minimal latency in encoding/decoding the digital media stream (which can be beneficial for live communications, and like applications).

The following illustrated implementation of this adaptive coefficient scan order technique has the following properties:

1. The scan order is allowed to vary across the digital media data (e.g., image), with the constraint that the scan order is changed or updated only subsequent to its use within a block.

2. The algorithm for scan order adaptation is based on a conditional exchange step whereby two successive scan indices are flipped under certain conditions.

Figure 6:
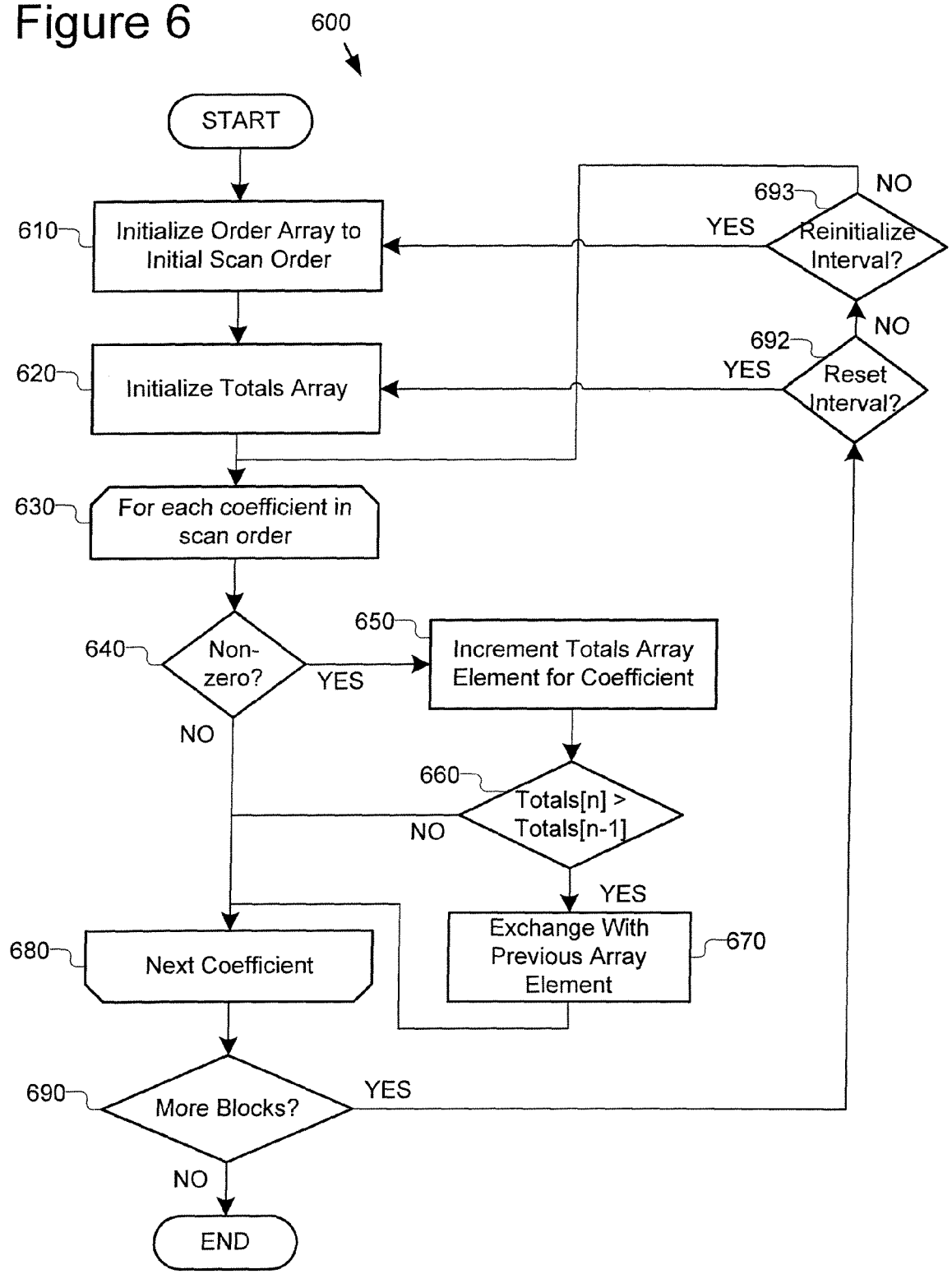
FIG. 6 is a flow chart of a procedure for coefficient scan order adaptation in the encoder of FIG. 4 and decoder of FIG. 5.
Figure 7:
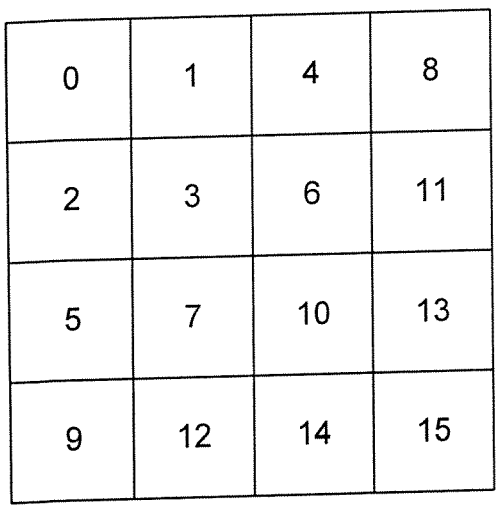
FIG. 7 is a diagram illustrating an initial scan order of horizontal coefficients for the adaptive coefficient scan order procedure of FIG. 6.
Figure 8:
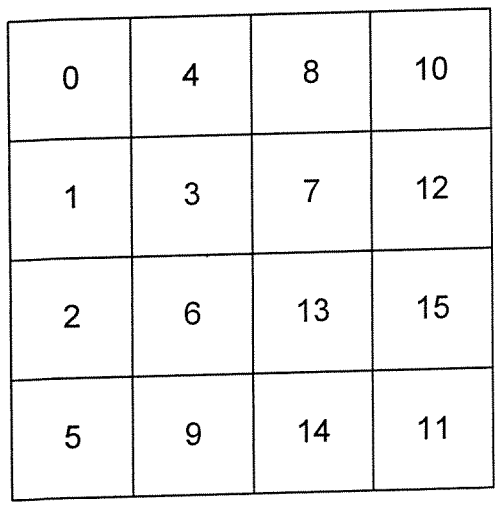
FIG. 8 is a diagram illustrating an initial scan order of vertical coefficients for the adaptive coefficient scan order procedure of FIG. 6.

FIG. 6 shows a procedure 600 according to one implementation of the adaptive coefficient scan order technique in the encoder 400 and decoder 500. The procedure 600 begins at operation 610 by initializing the coefficient scan order (or orders in cases where multiple scan orders are adaptively varied, e.g., for horizontal and vertical coefficients) to a known ordering expected to perform well across a typical range of data. In some implementations of the adaptive coefficient scan order technique, this initial ordering may be different in different scan order contexts, such as coefficient scan orders for macroblocks showing a predominantly "horizontal" orientation versus "vertical" orientation. In some adaptive coefficient scan order procedure implementations, the orientation or scan context can be signaled explicitly from the encoder to the decoder. In other implementations, this orientation can be inferred from the orientation of the DC sub-band transmitted prior to the AC coefficients. For example, FIG. 7 shows an example of an initial scan order 700 for a 4×4 block having a horizontal orientation. FIG. 8 shows an example of an initial scan order 800 for a 4×4 block having a vertical orientation. In this example, the horizontal orientation scan order 700 is the initial scan order also used for blocks showing no particular orientation.

As shown in FIG. 9, the illustrated procedure 600 tracks the local statistics of block coefficients using two 1-dimensional arrays: an Order array 910 and a Totals array 920. A separate set of the arrays is kept for each scan order context. In the illustrated implementation, this array (labeled "Order") contains as its entries the inverse scan, i.e. the index of the coefficient in ascending scan order. The procedure 600 initializes this array to the initial scan order in the initialization operation 610. FIG. 9 illustrates the values stored in the Order array 910 for the example initial vertical orientation scan order 800 shown in FIG. 8 at initialization. In this illustration, the DC coefficient is sent prior to the AC coefficients, and therefore does not appear in the array.

For each inverse scan Order array 910, the procedure 600 also keeps the array labeled "Totals" in this illustration, in which the procedure 600 tallies the incidence of occurrence of the respective coefficient. At a next operation 620, the procedure 600 initializes the Totals array with arbitrary descending values. For instance, this array is populated with values $\{k*N, k*(N-1), k*(N-1), \ldots, k\}$ for some value of k. This is shown in the lower row of the table in FIG. 9. The value k in this example is chosen to be a small integer, typically between 2 and 4. In some implementations of the adaptive coefficient scan order procedure, the choice of k may be based on the quantization parameter used in quantization 470 (FIG. 4).

During the process of encoding, the procedure 600 traverses the coefficients of the current block according to the scan order reflected in the elements of the Order array 910 (as indicated in "for" loop 630, 680). In this traversal, the procedure updates the incidence of occurrence statistic of the coefficient reflected in the Totals array 920. More specifically, the procedure 610 in this illustrated implementation updates the Totals array according to the incidence of a non-zero value for the respective coefficient. If the $n^{th}$ element of the scan is nonzero (i.e. transform coefficient with index Order[n] is nonzero), then the procedure 600 increments the $n^{th}$ element of Totals by 1 (i.e., Totals[n]:=Totals[n]+1) as illustrated by operations 640 and 650.

If, after incrementing, it is found that Totals[n]>Totals[n−1], then this means that a non-zero value for the current coefficient has occurred with higher frequency than for the previous coefficient thus far. In such an event (operation 660), the procedure applies an exchange operation 670 to the scan order. During the exchange operation 670, the scan orders and corresponding Totals of n and n−1 are swapped as shown in the following pseudo-code:

```
Temp := Order[n]
Order[n] := Order[n − 1]
Order[n − 1] := Temp
Temp := Totals[n]
Totals[n] := Totals[n − 1]
Totals[n − 1] := Temp
```

As a result of the exchange operation 670, the coefficient indexed by Order[n] (prior to exchange) is now scanned prior to the coefficient indexed by Order[n−1] (prior to exchange). This is in effect a bubble sort of the coefficients based on their incidence of occurrence of a non-zero value for the coefficient.

Figure 12:
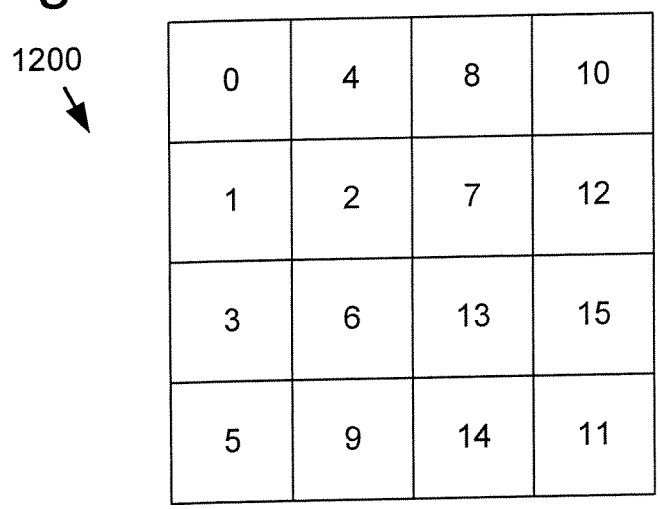
FIG. 12 is a diagram illustrating a resulting scan order corresponding to the arrangement shown in FIG. 11 for elements of the arrays of FIG. 9 after the element swapping operation shown in FIG. 10.

For example, FIG. 10 shows a situation where Totals[n]>Totals[n−1]. The arrows show the elements that need to be exchanged. FIG. 11 shows the Order and Totals arrays subsequent to the exchange, and FIG. 12 shows the corresponding scan order indices on the 4×4 block.

In the illustrated adaptive coefficient scan order procedure 600, there is no further conditional exchange of Totals[n−1] and Totals[n−2], etc. This means that there is at most one transition in the scan order array for each nonzero coefficient, and therefore the illustrated procedure 600 has a linear order of complexity in the number of nonzero coefficients. A coefficient can move at most one place in the scan order for each block traversal inside the loop 630-680.

The illustrated procedure 600 does not guarantee optimality at every stage, but over the long run it can be shown that the scan array approaches the global optimum for a stationary distribution, based on the logic of the ordering algorithm.

Because the process of adaptation involves only the current coefficient (in loop 630-680) and the previous scan element (which may or may not have been nonzero), and further because the conditional switch occurs after the coefficient is encoded from/decoded to the transform matrix, the adaptation is causal. Equivalently, the entire block can be coded using the current scan order. Subsequently, the scan order can be modified based on the coded nonzero coefficients and Totals array. Therefore, there is no additional latency introduced in the process of encoding or decoding.

After traversing all coefficients in the current block, the procedure 600 checks whether there are further blocks of the digital media data (e.g., the image being encoded) to be encoded/decoded at operation 690. The procedure 600 then ends when all blocks have been processed.

At periodic intervals, the procedure 600 resets the Totals array to the initialization state so as to prevent arithmetic overflow, and to facilitate adaptation. In one implementation of the adaptive coefficient scan order procedure in an image compression codec, the Totals array is reset at the start of every chunk of 8 macroblocks (macroblocks are 16×16 arrays of luminance pixels and include corresponding chrominance pixels). The maximum value of any element of the Totals array is restricted to 8 (macroblocks)×16 (coefficients of a certain frequency in a macroblock)×3 (color planes in a macroblock)=384+maximum initialization value, which is safely below 511. 9 bits are sufficient for the Totals array in this case. Other reset intervals may be chosen for more or less rapid adaptation, and reset intervals may be quantization parameter dependent. Accordingly, at the Totals array reset interval as illustrated by operation 692, the procedure 600 loops back to the operation 620 where the Totals array is initialized, before proceeding to process a next block of coefficients.

At other (less frequent) periodic intervals, both the Totals and Order arrays are reset to the initialization states so as to facilitate random access at these locations. As illustrated at operation 693, the procedure loops back to the Totals and Order arrays' initialization operation 610 at such intervals. For example depending on the codec implementation, the procedure can reset to the initialization state at entry points to independently coded portions of the image bitstream, or at the beginning of each image of a video sequence, etc.

3. Comparison To Bubble sort

Bubble sort is a conventional computer procedure for the sorting of an array of data. A bubble sort procedure can be described as follows. Let an N element array (which may be assumed, without loss of generality, to be numeric) be represented by X. X[i] is the ith element, with the index i running from 1 through N.

The bubble sort proceeds by N−1 traversals of the array, each traversal being composed of N−1 conditional exchange operations. The conditional exchange operation for an ascending sort order is defined as follows:

If for some i between 2 and N, exchange the array elements X[i−1] and X[i] if X[i−1]>X[i].

During each traversal, the conditional exchange operation is applied for each index i starting at 2 and running in order to N.

At the end of N−1 traversals, the array X is sorted. The same procedure may be used, with minor modifications, to sort in descending order, alphabetically, or to generate rank order indices. In practice, bubble sort is not used often because of its unfavorable running time.

The adaptive coefficient scan order procedure 600 described here is based on a similar conditional exchange operation, i.e., the conditional exchange operation 660, 670. The illustrated implementation of the adaptive coefficient scan order procedure 600 differs from the bubble sort in that the illustrated procedure 600 follows a more relaxed updating schedule. More particularly, two differences from bubble sort include:

1. there is only one traversal of the array per encoded/decoded block, and
2. during each traversal, the conditional exchange operation is applied only to array elements corresponding to nonzero coefficients.

These differences help to ensure that the computational complexity of the procedure 600 is bounded and well within the capabilities of any image/video codec. At the same time, the use in the procedure 600 of the conditional exchange operation 660, 670 (as in a bubble sort) has the benefit that optimality is maintained in an asymptotic sense when the statistics (as reflected in the Totals array) are stable.

The illustrated adaptive coefficient scan order procedure 600 has been found to result in a bitrate savings that can be as high as 2%, compared with an entropy coding scheme that uses fixed scan tables. Alternatively, this technique may be used in conjunction with other sophisticated context models to choose between one of several adaptive tables, and also with Huffman, bitplane or arithmetic encoding techniques for run length coding of data. For instance, different adaptive scan models may be used with the high pass and low pass bands.

The adaptive coefficient scan order technique may be used to code larger transform sizes, as well as to code with multiple transform shapes (e.g., on 4×8 and 8×4 size blocks, etc.). Likewise, blocks or macroblocks may be scanned in any pre-determined manner across the image. The conditional exchange step may employ hysteresis, or different rules for performance benefits, or to degrade/obfuscate data for rights management purposes.

4. Computing Environment

The above described codec utilizing the adaptive coefficient scan order technique can be performed on any of a variety of devices in which digital media signal processing is performed, including among other examples, computers; image and video recording, transmission and receiving equipment; portable video players; video conferencing; and etc. The digital media coding techniques can be implemented in hardware circuitry, as well as in digital media processing software executing within a computer or other computing environment, such as shown in FIG. 13.

Figure 13:
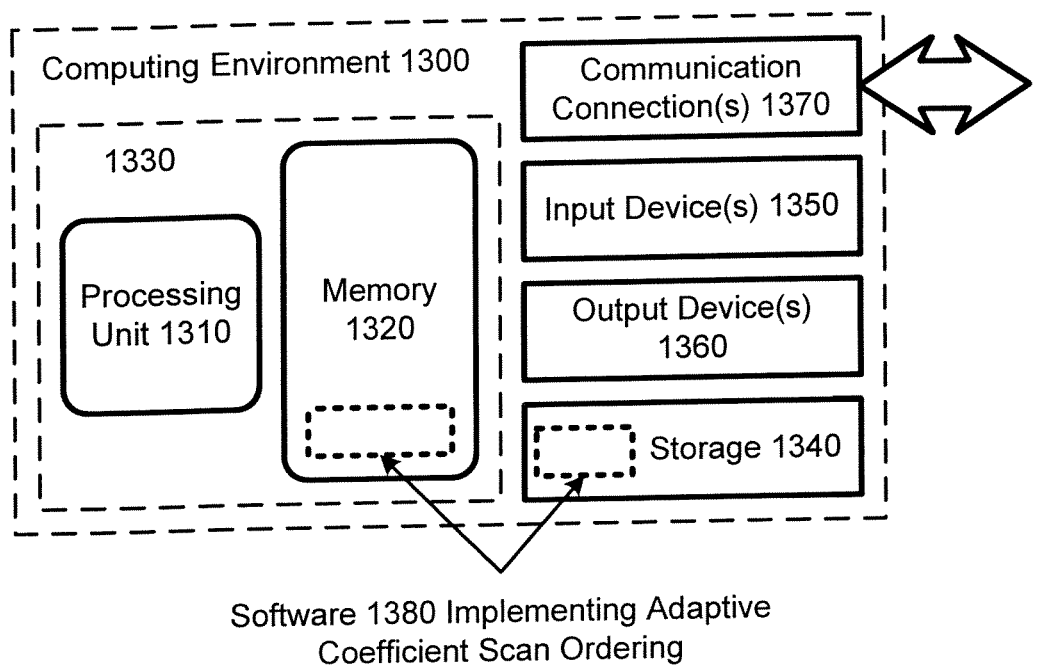
FIG. 13 is a block diagram of a suitable computing environment for implementing the block transform-based codec with improved spatial-domain lapped transform of FIGS. 4 and 5.

FIG. 13 illustrates a generalized example of a suitable computing environment (1300) in which described embodiments may be implemented. The computing environment (1300) is not intended to suggest any limitation as to scope of use or functionality of the invention, as the present invention may be implemented in diverse general-purpose or special-purpose computing environments.

With reference to FIG. 13, the computing environment (1300) includes at least one processing unit (1310) and memory (1320). In FIG. 13, this most basic configuration (1330) is included within a dashed line. The processing unit (1310) executes computer-executable instructions and may be a real or a virtual processor. In a multi-processing system, multiple processing units execute computer-executable instructions to increase processing power. The memory (1320) may be volatile memory (e.g., registers, cache, RAM), non-volatile memory (e.g., ROM, EEPROM, flash memory, etc.), or some combination of the two. The memory (1320) stores software (1380) implementing the described encoder/decoder and adaptive coefficient scan order procedure.

A computing environment may have additional features. For example, the computing environment (1300) includes storage (1340), one or more input devices (1350), one or more output devices (1360), and one or more communication connections (1370). An interconnection mechanism (not shown) such as a bus, controller, or network interconnects the components of the computing environment (1300). Typically, operating system software (not shown) provides an operating environment for other software executing in the computing environment (1300), and coordinates activities of the components of the computing environment (1300).

The storage (1340) may be removable or non-removable, and includes magnetic disks, magnetic tapes or cassettes, CD-ROMs, CD-RWs, DVDs, or any other medium which can be used to store information and which can be accessed within the computing environment (1300). The storage (1340) stores instructions for the software (1380) implementing the codec and adaptive coefficient scan order procedure.

The input device(s) (1350) may be a touch input device such as a keyboard, mouse, pen, or trackball, a voice input device, a scanning device, or another device that provides input to the computing environment (1300). For audio, the input device(s) (1350) may be a sound card or similar device that accepts audio input in analog or digital form, or a CD-ROM reader that provides audio samples to the computing environment. The output device(s) (1360) may be a display, printer, speaker, CD-writer, or another device that provides output from the computing environment (1300).

The communication connection(s) (1370) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The digital media processing techniques herein can be described in the general context of computer-readable media. Computer-readable media are any available media that can be accessed within a computing environment. By way of example, and not limitation, with the computing environment (1300), computer-readable media include memory (1320), storage (1340), communication media, and combinations of any of the above.

The digital media processing techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

I claim:

1. A block transform-based method of encoding a compressed bitstream containing digital media data, the method comprising:
    iteratively for each of a plurality of successive blocks in order:
    entropy encoding coefficient values at locations of a current one of the plurality of successive blocks according to a scan order;
    analyzing the statistical incidence of occurrence of non-zero-value coefficient values at the locations;
    updating a set of cumulative statistics of the occurrence of non-zero-value coefficients at the locations, the cumulative statistics accounting for the occurrence of non-zero-value coefficient values at the locations in each block previously encoded since a scan order was set to an initial order; and
    adapting the scan order according to said updated cumulative statistics,
    wherein the adapting comprises exchanging the scan order of a first location with the scan order of a second location if the cumulative statistics indicate a higher occurrence of non-zero coefficient values at the second location than at the first location and not exchanging the scan order of the first location with the scan order of the second location if the cumulative statistics indicate a lower occurrence of non-zero coefficient values at the second location than at the first location, wherein the scan order of the second location is adjacent to the scan order of the first location, and wherein the method further comprises performing no further changes to the scan order of the second location for the current block if the scan order of the first location is exchanged with the scan order of the second location.

2. The method of claim 1 further comprising periodically resetting the statistics of the incidence of non-zero-value occurrence of coefficients values at the locations during the encoding of blocks of the digital media data.

3. The method of claim 1 further comprising:
initializing the scan order to an initial order; and
periodically re-initializing the scan order.

4. The method of claim 1, wherein the scan order is stored in a first array and the cumulative statistics are stored in a second array.

5. The method of claim 1 further comprising:
performing the adapting the scan order on a deterministic, causal basis, whereby explicit signaling of the coefficient scan order in the encoded digital media data is avoided.

6. The method of claim 1, further comprising performing only a single conditional exchange of two locations in the scan order per block of the digital media data.

7. At least one computer-readable media device storing a program for causing a computer to perform a method, the method comprising:
iteratively for each of a plurality of successive blocks in order:
entropy encoding coefficient values at locations of a current one of the plurality of successive blocks according to a scan order;
analyzing the statistical incidence of occurrence of non-zero-value coefficient values at the locations;
updating a set of cumulative statistics of the occurrence of non-zero-value coefficients at the locations, the cumulative statistics accounting for the occurrence of non-zero-value coefficient values at the locations in each block previously encoded since a scan order was set to an initial order; and
adapting the scan order according to said updated cumulative statistics,
wherein the adapting comprises exchanging the scan order of a first location with the scan order of a second location if the cumulative statistics indicate a higher occurrence of non-zero coefficient values at the second location than at the first location and not exchanging the scan order of the first location with the scan order of the second location if the cumulative statistics indicate a lower occurrence of non-zero coefficient values at the second location than at the first location, wherein the scan order of the second location is adjacent to the scan order of the first location, and wherein the method further comprises performing no further changes to the scan order of the second location for the current block if the scan order of the first location is exchanged with the scan order of the second location.

8. The at least one computer-readable media device of claim 7, wherein the method further comprises periodically resetting the statistics of the incidence of non-zero-value occurrence of coefficients values at the locations during the encoding of blocks of the digital media data.

9. The at least one computer-readable media device of claim 7, wherein the method further comprises:
initializing the scan order to an initial order; and
periodically re-initializing the scan order.

10. The at least one computer-readable media device of claim 7, wherein the scan order is stored in a first array and the cumulative statistics are stored in a second array.

11. The at least one computer-readable media device of claim 7, wherein the method further comprises:
performing the adapting the scan order on a deterministic, causal basis, whereby explicit signaling of the coefficient scan order in the encoded digital media data is avoided.

12. The at least one computer-readable media device of claim 7, wherein the method further comprises performing only a single conditional exchange of two locations in the scan order per block of the digital media data.

13. A digital media processing device, comprising:
a memory; and
a processor programmed to perform a method, the method comprising:
for each of a plurality of successive blocks in order:
entropy encoding coefficient values at locations of a current one of the plurality of successive blocks according to a scan order;
analyzing the statistical incidence of occurrence of non-zero-value coefficient values at the locations;
updating a set of cumulative statistics of the occurrence of non-zero-value coefficients at the locations, the cumulative statistics accounting for the occurrence of non-zero-value coefficient values at the locations in each block previously encoded since a scan order was set to an initial order; and
adapting the scan order according to said updated cumulative statistics,
wherein the adapting comprises exchanging the scan order of a first location with the scan order of a second location if the cumulative statistics indicate a higher occurrence of non-zero coefficient values at the second location than at the first location and not exchanging the scan order of the first location with the scan order of the second location if the cumulative statistics indicate a lower occurrence of non-zero coefficient values at the second location than at the first location, wherein the scan order of the second location is adjacent to the scan order of the first location, and wherein the method further comprises performing no further changes to the scan order of the second location for the current block if the scan order of the first location is exchanged with the scan order of the second location.

14. The digital media processing device of claim 13, wherein the method further comprises periodically resetting the statistics of the incidence of non-zero-value occurrence of coefficients values at the locations during the encoding of blocks of the digital media data.

15. The digital media processing device of claim 13, wherein the method further comprises:
initializing the scan order to an initial order; and
periodically re-initializing the scan order.

16. A block transform-based method of encoding a compressed bitstream containing digital media data, the method comprising:
for each of a plurality of successive blocks in order:
entropy encoding coefficient values at locations of a current one of the plurality of successive blocks according to a scan order;
analyzing the statistical incidence of occurrence of non-zero-value coefficient values at the locations;
updating a set of cumulative statistics of the occurrence of non-zero-value coefficients at the locations, the cumulative statistics accounting for the occurrence of nonzero-value coefficient values at the locations in each block previously encoded since a scan order was set to an initial order; and adapting the scan order according to said updated cumulative statistics, wherein the adapting comprises exchanging the scan order of a first location with the scan order of a second location if the cumulative statistics indicate a higher occurrence of non-zero coefficient values at the second location than at the first location and not exchanging the scan order of the first location with the scan order of the second location if the cumulative statistics indicate a lower occurrence of non-zero coefficient values at the second location than at the first location, wherein the scan order of the second location is adjacent to the scan order of the first location, and wherein the method further comprises performing no further changes to the scan order of the second location for the current block if the scan order of the first location is exchanged with the scan order of the second location.

17. The method of claim 16, wherein the method further comprises periodically resetting the statistics of the incidence of non-zero-value occurrence of coefficients values at the locations during the encoding of blocks of the digital media data.

18. The method of claim 16, wherein the method further comprises:
 initializing the scan order to an initial order; and
 periodically re-initializing the scan order.

* * * * *